US008782119B2

(12) United States Patent
Stokking et al.

(10) Patent No.: US 8,782,119 B2
(45) Date of Patent: Jul. 15, 2014

(54) SYSTEM FOR MANAGING SERVICE INTERACTIONS

(75) Inventors: Hans Maarten Stokking, The Hague (NL); Fabian Arthur Walraven, Groningen (NL); Mattijs Oskar Van Deventer, Leidschendam (NL); Omar Aziz Niamut, Vlaardingen (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 211 days.

(21) Appl. No.: 12/682,958

(22) PCT Filed: Oct. 20, 2008

(86) PCT No.: PCT/EP2008/008850
§ 371 (c)(1),
(2), (4) Date: Apr. 14, 2010

(87) PCT Pub. No.: WO2009/049906
PCT Pub. Date: Apr. 23, 2009

(65) Prior Publication Data
US 2010/0228815 A1 Sep. 9, 2010

(30) Foreign Application Priority Data

Oct. 19, 2007 (EP) .................................. 07020488
Sep. 12, 2008 (EP) .................................. 08016108

(51) Int. Cl.
*G06F 15/16* (2006.01)
(52) U.S. Cl.
USPC ........... 709/202; 709/203; 709/205; 725/135; 370/279
(58) Field of Classification Search
USPC ................................................ 709/203, 224
See application file for complete search history.

(56) References Cited

U.S. PATENT DOCUMENTS

2003/0070182 A1* 4/2003 Pierre et al. ................... 725/135
2006/0291437 A1 12/2006 Naqvi et al.
(Continued)

FOREIGN PATENT DOCUMENTS

EP          1788764        5/2007
WO     WO2007/070652      6/2007

OTHER PUBLICATIONS

Beck et al (Blending Telephony and IPTV: Building the TV-Link Service Package Using the Alcatel-Lucent Service Broker (Mar. 21, 2007.*
International Search Report, International Application No. PCT/EP2008/008850 dated Dec. 10, 2008.
Extended European Search Report, European Patent Application EP07020488.8, dated Apr. 28, 2008.

(Continued)

*Primary Examiner* — Yves Dalencourt
(74) *Attorney, Agent, or Firm* — McDonnell Boehnen Hulbert & Berghoff LLP

(57) ABSTRACT

A system is disclosed for managing service interactions in a combined service. The system includes a first aspect of service delivery for providing a first service, a second aspect of service delivery for providing a second service, a combined aspect of service delivery for providing a combined service capable of associating the first service to one of the second service. The combined service is implemented using a combined state model, which includes a predetermined number of combined states formed on the basis of the states of the first and the second service and armed detection points for detecting predetermined transitions between the combined states. The combined aspect of service delivery further includes a combined state manager adapted to transmit a control signal to the first and/or the second aspects of service delivery for inducing a predetermined state transition in the respective first and/or the second service in response to the activation of an armed detection point.

20 Claims, 12 Drawing Sheets

(56) References Cited

U.S. PATENT DOCUMENTS

2007/0086582 A1    4/2007  Tai et al.
2007/0140150 A1*   6/2007  Beck et al. .................... 370/279
2007/0140299 A1    6/2007  Hofmann et al.

OTHER PUBLICATIONS

Roach, A.B., "Session Initiation Protocol (SIP)-Specific Event Notification", Network Working Group, Request for Comments 3265, Jun. 2002, pp. 1-36.

* cited by examiner ions in a combined service. Further, the invention
SYSTEM FOR MANAGING SERVICE INTERACTIONS

CROSS REFERENCE TO RELATED APPLICATIONS

The present application is a national stage entry of PCT/EP2008/008850, filed on Oct. 20, 2008, and claims priority to European Patent Application EP 07020488.8, filed in the European Patent Office on Oct. 19, 2007, and European Patent Application EP 08016108.6, filed in the European Patent Office on Sep. 12, 2008, the entire contents of both of which are incorporated herein by reference.

FIELD OF THE INVENTION

The invention relates to a system for managing service interactions in a combined service. Further, the invention relates to a method for managing service interactions in a system for providing a combined service and to a computer program product for performing the steps of the method.

BACKGROUND OF THE INVENTION

IP Multi-Media Subsystem (IMS) defined by the 3GPP and 3GPP2 standards open the door to a whole new range of new multi-media technologies, such as Voice over IP (VoIP) and IPTV. The IMS service architecture enables to combine services of various platforms to combined services. These combined services make use of the functionalities of various platforms to which end-terminals are connected to and are also referred to as blended or composite services.

WO2007/070652 describes an example of a blended or combined service allowing the caller ID information of the calling party to be displayed on the TV system of a subscriber. This caller ID service is implemented in the standard IMS services architecture. Interaction between the telephone and television services is managed by means of a central service broker referred to in IMS as the "Service Capability and Interaction Manger" (SCIM). The SCIM is implemented in the session control layer between the application server layer and the transport and end point layer as defined in the IMS architecture.

The service broker will receive incoming requests of services and processes these requests on the basis of a predetermined scheme such as first come first serve, priority or another predetermined sequence. Such schemes are known from service interactions in Intelligent Networks (IN), IMS, Parlay, etc. The service broker functions as a central gateway and thus requires all information traffic from and to the services to be led via the service broker. Such centralized scheme has disadvantages.

A first problem relates to the scalability of a central system. Increasing the number of services and combined services greatly increases the complexity of the central service manager. Further, increasing the number of end-terminals will greatly increase the data traffic to be controlled. The central service manager will become a bottleneck in scaling the system to large-scale applications.

A second problem relates to the fact that addition of a new service to an existing service system managed by a central broker will require to configuration and adaptation of the central broker. Frequent adaptation of the central broker bears the risk of a major failure of the whole service delivery.

SUMMARY OF THE INVENTION

It is an object of the invention to reduce or eliminate at least one of the drawbacks of the prior art and to provide a system for managing service interactions in a combined service.

The system according to the invention comprises a first service delivery means for providing a first service, a second service delivery means for providing a second service and a combined service delivery means for providing a combined service capable of associating the first service to the second service. The combined service is implemented using a combined state model, which comprises a predetermined number of combined states formed on the basis of the states of the first and second service and armed detection points for detecting predetermined transitions between the combined states. The combined service delivery means comprises a combined state manager adapted to transmit a control signal to the first and/or second service delivery means for inducing a predetermined state transition in the respective first and/or second service in response to the activation of an armed detection point.

By implementing the combined service using a combined service model based on the state models of the underlying services, the system is able to manage service interactions without the necessity of a central service manager and without putting any constrains on the underlying network architecture.

In one embodiment of the invention, the first service is delivered to a first end-terminal, and the second service is delivered to an at least second end-terminal.

In another embodiment the combined service is capable of associating the first end-terminal to the at least second end-terminal.

In yet another embodiment the first and the second service are delivered to the same end-terminal.

In one embodiment of the invention the combined state manager is adapted to receive state information from the first and second service and to determine the combined state of the combined service.

In another embodiment the combined service delivery means further comprises a combined service logic which upon activation of an armed detection point retrieves from a decision database service interaction information associated with the armed detection point and transmits on the basis of the service interaction information a control signal to the first and/or second service delivery means. The activation of an armed trigger point allows the combined service to respond to state transition in the combined state model.

In one embodiment the first service delivery means is adapted to execute a first service logic and the second service delivery means is adapted to execute a second service logic. The first and second service logic are implemented using a first and second state model respectively, each comprising the states of the service, state transitions and detection points for detecting state transitions.

In another embodiment the combined states form combinations of the states of the first and second service. Using combinations of the first and second states, the combined state model effectively couples the first service to the second service. Evaluation of these coupled states, i.e. the combined states, allows efficient management of the interactions between the services.

In a further embodiment at least one state of the first or second service is extended to a predetermined number of extended states. The extended states comprise at least a first extended state indicative that a transition to the state is caused by the combined service and a second extended state indicative that a transition to the state is caused by the first or second service. Extending a state of the first or second service to a number of extended states allow the combined service to administer the cause of a state transition in the combined service. This way the combined service is able to make a distinction between state transitions which are triggered by the combined service self and state transitions which are triggered by one of the services.

In yet a further embodiment the extended states comprise at least a first extended state indicative that a transition to the state is caused by the combined service.

In a further embodiment the extended states also comprise a second extended state indicative that a transition to the state is caused by some other service. This other service may be the first or the second service or some further service. The second extended state may be either general, indicating that some other service is the cause of the state transition but not indicating which other service is the actual cause, or could be specific i.e. indicating precisely which other service is the cause of the state transition.

In yet a further embodiment the combined service delivery means further comprises a first and second state manager for receiving state information from the first and second service respectively and transmitting the state information to the combined service manager.

In one embodiment the combined service manager further comprises one or more event listeners adapted to subscribe to notifications from the first and/or second service to send state information of the respective first service and/or second service to the combined service. The use of event listeners allows efficient notification of the state of a service.

In another embodiment the state information comprises the state of a service and state transition information identifying the cause of the transition to the state. The state transition information allows the combined service to make a distinction between state transitions, which are triggered by the combined service, and state transitions which are triggered by the first and/or second service.

In one embodiment of the invention the first service delivery means is a telephone service executed on a telephone platform, comprising at least a state <available> indicative that the telephone is available and a state <in_call> indicative that the telephone is in call. The second service delivery means is a television service executed on television platform, comprising at least a state <playing>, indicative that the television is playing, and a state, <pausing> indicative that the TV is on pause.

In a further embodiment of the invention the combined service states comprise combinations between the states <available> and <in_call> of the telephone service and the states <playing>, <pausingCS> <pausingOS> of the television service. The state <pausingCS> represents the first extended state of the <pausing> state indicative that the combined service (CS) caused a transition to that state. The state <pausingOS> represents the second extended states of the state <pausing> indicating that another service (OS) than the combined service caused a transition to that state. More extended states may be defined to distinguish in more detail which service was the cause of the state transition. The combined states thus define a combined state model of combined telephone-television service, allowing efficient management of interactions between the telephone and the television service.

In one embodiment according to the invention the combined service is configured to allow a client to access the combined service via an interface, preferably a website interface, in order to select a predetermined configuration of the combined service, wherein the combined service uses the selected configuration to arm one or more detection points in the combined model.

In another embodiment according to the invention at least one of the first or second service delivery means is an telecommunications platform, preferably a telecommunications platform supporting IP-based telecommunications services such as IP Multimedia Subsystem (IMS) type platform, a digital television platform, a platform for executing business process management services or a platform for a home network system.

In one embodiment the first state model is the Basic Call State Model (BCSM).

In another embodiment combined service delivery means is implemented as an application server connected via a network to the first and second service delivery means.

In yet another embodiment the combined service delivery means is implemented in a set-top box. In a further embodiment the first and second service delivery means are implemented with the combined service delivery means in the set-top box.

The invention also relates to a method for managing service interactions in a system for providing a combined service as described in the embodiments above. In one embodiment the method comprises the steps of: (i) the combined service detecting a transition to a new combined state, and (ii) the combined service transmitting in response to the activation of an armed detection point a control signal to the first and/or second service delivery means for inducing a predetermined state transition in the respective first and/or second service.

Further, the invention relates to a computer program product, directly loadable into an internal memory of a digital computer comprising software code portions for performing the steps in the method as described above, when the product is run on a computer.

The invention also relates to an end-terminal comprising a combined service delivery means according as described above.

The invention will be further illustrated with reference to the attached drawings, which schematically show embodiments according to the invention. It will be understood that the invention is not in any way restricted to these specific embodiments.

DETAILED DESCRIPTION

Figure 1:
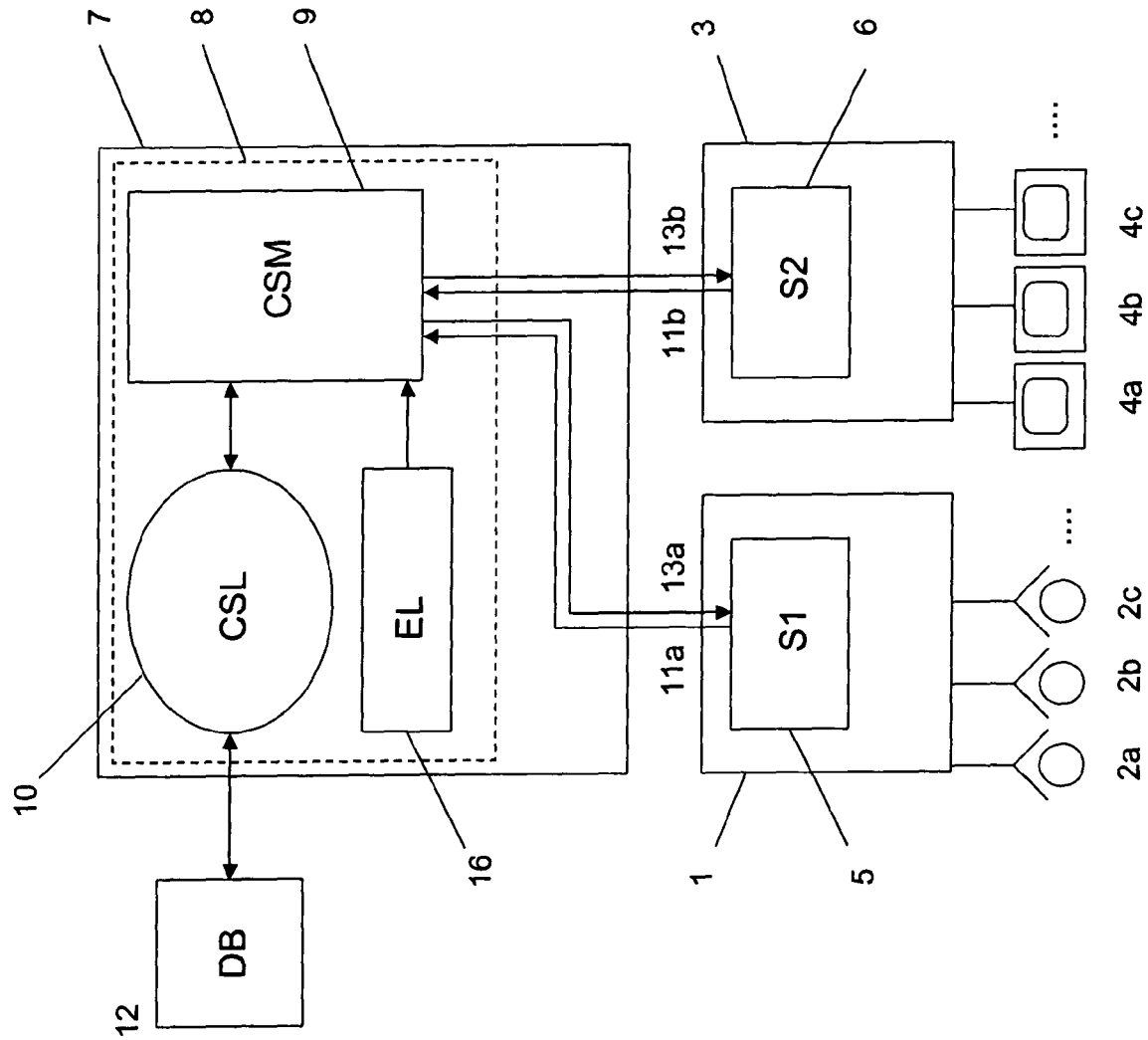
FIG. 1 depicts an exemplary first example of a system according to the invention.

FIG. 1 depicts an exemplary schematic drawing of the system according to the invention. The system comprises a first service delivery means 1 connected to one or more first end-terminals 2a, 2b, 2c, . . . and a second service delivery means 3 connected to one or more second end-terminals 4a, 4b, 4c, . . . . The first and second service delivery means are adapted to deliver a first service (S1) 5 and second service (S2) 6 to the respective first and second end-terminals.

The service delivery means may be a telecommunications platform providing one or more telephone services to an end-terminal connected thereto. Such telecommunications platform is capable of delivering telephone services such as ID caller, SMS messaging, Follow on Call, etc. Preferably the telecommunications supports IP-based telecommunications functionality such as VoIP.

The service delivery means may also be a service provider providing Internet services, or a television platform providing televisions services, such as digital broadcast services including IPTV, HDTV, DVB, Video on Demand (VoD) or a platform for running business process management (BPM) services, etc.

The end-terminals may be set-top boxes connecting a telephone, a television, a PC, a PDA, etc. to a suitable service delivery means.

The services running on the service delivery means are implemented using a state model. For a basic telephone service this may be the Basic Call State Model (BCSM). The state model is a state machine description of a service in terms of states, state transition and detection points for detecting the state transitions. If an existing service is not implemented on the basis of a state model, it is possible to provide an interface, usually a software interface, which models the behavior of the service in terms of states and state transitions.

The first and second service delivery means are connected to a combined service delivery means 7, which hosts the one or more combined services 8. The combined delivery means 7 may be hosted on an application server located somewhere in a network or, alternatively, the combined delivery means 7 may also be implemented as a hardware/software unit in an end-terminal, such as a set-top box, located at the home of the user.

The combined service delivery means comprises a combined state manager (CSM) 9 connected to the first and second service delivery means 1,3 and a combined service logic (CSL) 10. The combined state manager 9 retrieves state information 11a,11b on the first and/or second service and determines on the basis of the state information the combined state of the combined service 8. The state information may comprise the states of a service and the cause of a state transition in that service. If a state transition in the combined service activates an armed detection point of the combined state model, the combined state manager triggers the combined service logic 10. On the basis of the state information and additionally information stored in a decision database 12 the combined service is able to transmit one or more control signals 13a, 13b to the first and/or second service, wherein a control signal will induce a predetermined state transition in a service to which it was transmitted. This process will be described in more detail hereunder.

If the first service delivery means is a telecommunications platform for providing telecommunications services, then the telecom service may communicate with the combined service delivery means using the Session Initiation Protocol (SIP), the Intelligent Network Application Part (INAP), the Mobile Application Part (MAP), the Customized Application for Mobile network Enhanced Logic (CAMEL), OSA/Parlay or other known protocols. Similarly, if the second service delivery means is a television platform, then the television service may communicate with the combined service delivery means using web services technology such as XML, SOAP, etc.

Figure 2:
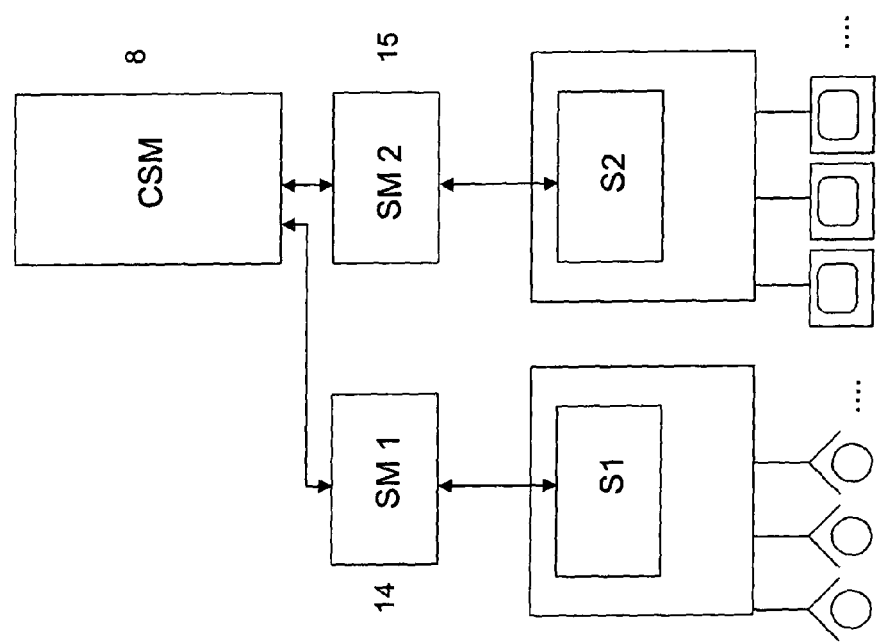
FIG. 2 depicts an exemplary second example of a system according to the invention.

The combined service manager may retrieve and manage the state information itself, or alternatively, the combined service manager is connected to a first state manager 14 and second state manager 15. This is schematically illustrated in FIG. 2. Each state manager 14,15 retrieves and manages the state information of one particular service and sends this to the combined service manager 8.

The combined service manager or the state managers may use one or more event listeners 16 for retrieving state information. An event listener subscribes to state-transitions ("events") detected by a particular detection point in the state model of the first and/or second service so that every time a certain state transition occurs it notifies the combined state manager 8 or a state manager 14,15 of the occurrence of such event. This way the event listener makes a detection point an "armed" or "active" detection point. The combined state manager 8 is able to retrieve the new state information and to determine on the basis of this information the new state of the combined state model.

The combined service delivery means 7 may be implemented as an application server, which is connected via one or more networks to the first and second service delivery means. The state managers 14,15 may be located in the application server, in the service delivery means hosting the first and second services or a separate unit hosing the state managers, which is connected to the first and second service delivery means and the combined service delivery means. Further, the combined delivery means 7 may also be implemented as a set-top box located at home or as a distributed system.

Hereafter the invention will be illustrated in more detail by a combined service "FoneFreez", which is an exemplary embodiment of the invention. The FoneFreez service is a combined service combining a basic telephone service with a basic television service. In that case, the first service delivery means is a basic telephone platform, preferably providing an IP-based telephony service, and the second service delivery means is a basic television platform, preferably providing a digital television service.

Upon reception of an incoming call from a first end-terminal, typically a telephone, FoneFreez will be activated and send a pause command to a second end-terminal, typically a set-top box, so that the TV connected to the set-top box is set to the pause state. This allows the viewer of the TV to start the telephone conversation without being disturbed by the TV. Then, after termination of the telephone conversation, FoneFreez will send a play command the TV. The blended FoneFreez service is similar to as the PauseOnIncoming Call (POIC) blended service as described in Annex A.7.3 of ETSI TS 181 016.

Figure 3:
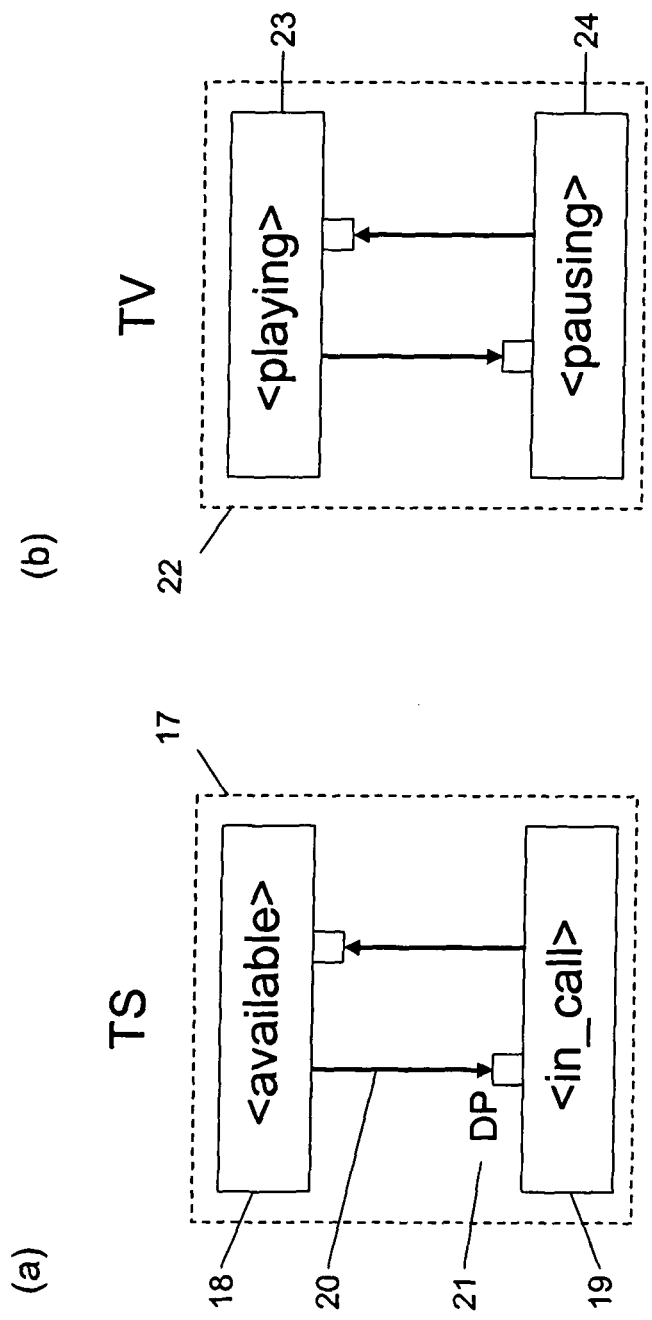
FIG. 3 shows the a simplified diagram of a state model of a telephone service and a TV service.

The process flow of the telephone- and TV service can be described by a state model. As shown in FIG. 3(a), the telephone service (TS) may be described by a state model 17, comprising—in its simplest form—the states <available> 18, indicating that no call is in progress and <in_call> 19, indicating that a call is in progress. Such a simple state model can be extended to more complex state models such as the Basic Call State Model (BCSM) as used in Intelligent Networks, which describes the Call Control Function (CCF) activities required to establish and maintain communication paths for subscribers to intelligent network (IN) services. For circuit switched operation, there is an Originating and Terminating BCSM. Such models may comprise a large number states.

When the user of the first end-terminal starts a telephone conversation, the state of the telephone service will change from <available> to <in_call>. This transition 20 can be detected by a detection point (DP) 21 in the state model. Upon termination of the call, a transition back to <available> is detected by second detection point.

Similarly, a basic TV service (TV) can be described by a state model 22, comprising the TV state <playing> 23, indicating that a TV program is in progress, and <pausing> 24, indicating that the TV program on pause. Transitions between these states are detected by detection points in the TV state model as indicated schematically in FIG. 3(b).

Figure 4:
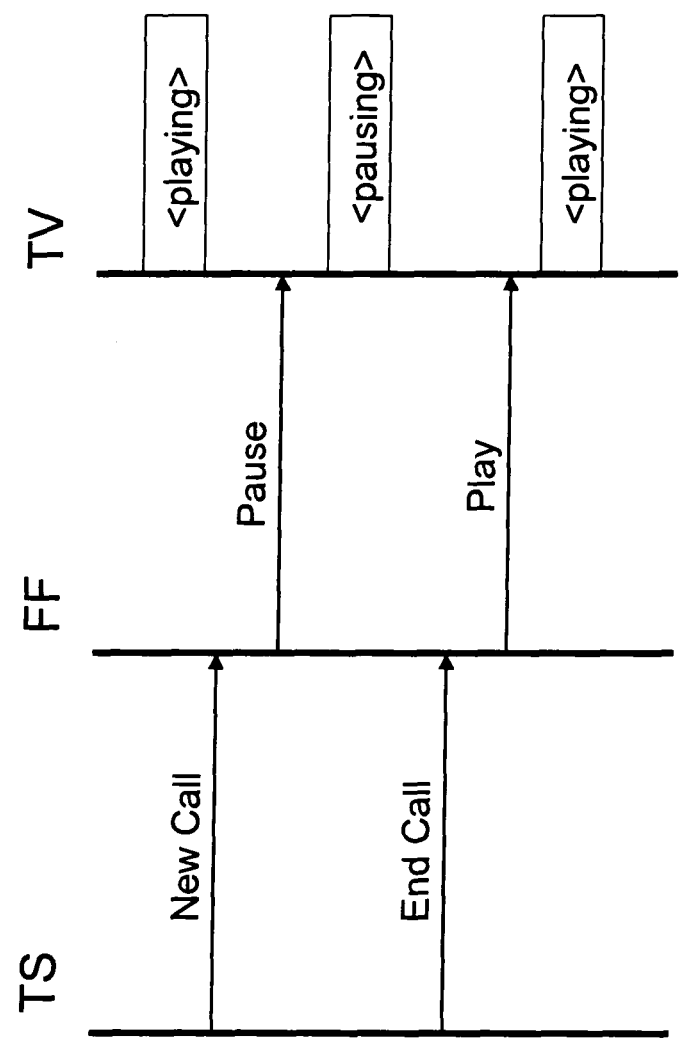
FIG. 4 illustrates the process flow of an exemplary embodiment of a combined service.

The basic functionality of FoneFreez is shown in FIG. 4. Upon a first incoming telephone call (New Call) FoneFreez (FF) will send a control signal, in this case a pause command, to the set-top box of the TV, thereby changing the TV state from <playing> to <pausing>. Similarly, after termination of the call (End Call), FoneFreez will cause the TV state to change to <playing>. Thus, depending on a predetermined state transition in the telephone service, the FoneFreez can take action by inducing a transition in the TV state. The combined service is thus capable of associating a telephone end-terminal connected to a telephone platform hosting a telephone service to a the television end-terminal connected to a television platform hosting a television service.

It is also possible that state transitions of the TV are caused by other sources or services then FoneFreez, such as a Remote Control (RM) or another service, such as Call Waiting (CW).

Figure 5:
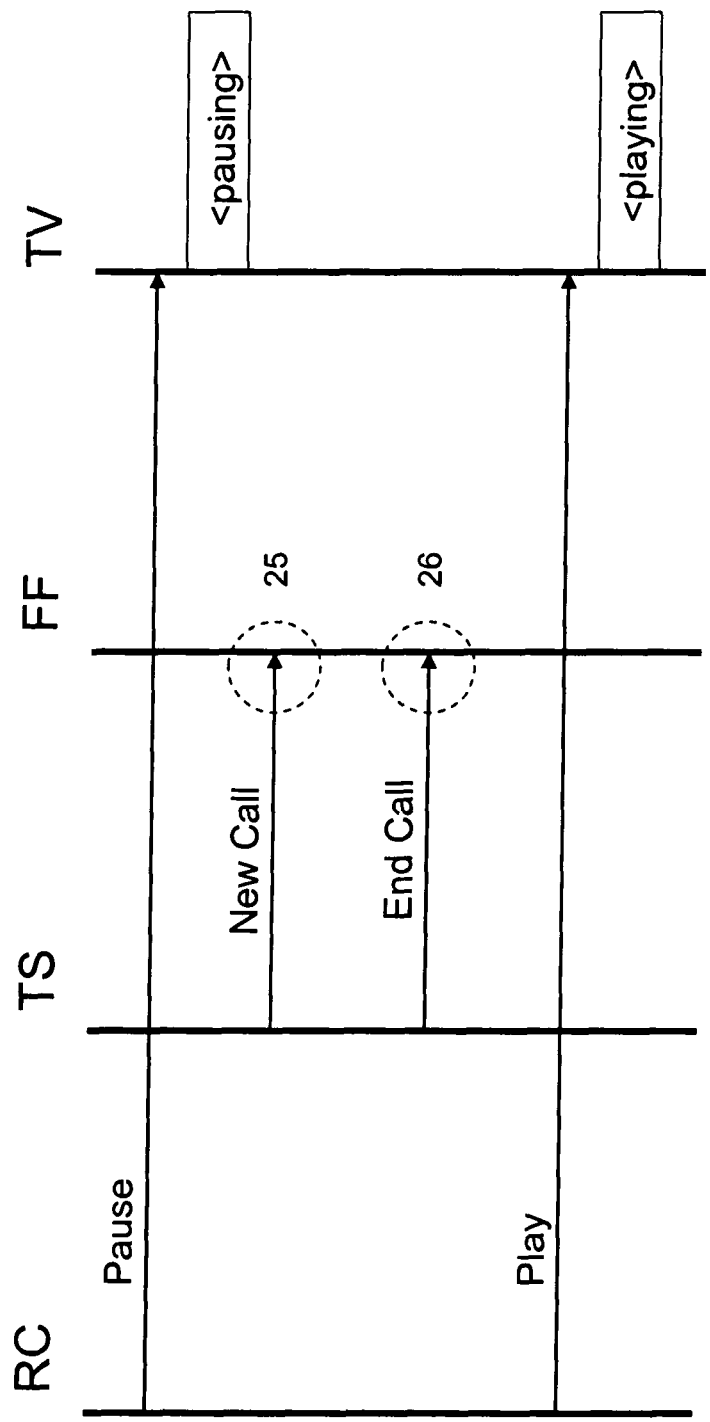
FIG. 5 illustrates the process flow of a first service interaction in an exemplary embodiment of a combined service.

FIG. 5 illustrates the flow of a first interaction of FoneFreez with a Remote Control (RC) of the TV. The viewer may use the Remote Control to set the TV on pause. Then, upon reception of an incoming call (for instance by an answering machine) FoneFreez will normally send a pause command to the TV. This is however not necessary because the TV is already on pause. Further, after termination of the call, FoneFreez will send a play command to the TV, causing a transition to <playing>. Such situation however is not desired as the viewer wants to have the TV on pause.

In order to avoid such unwanted service interaction, FoneFreez can be made aware that, if the TV is set in the pausing state by the Remote Control and a new call arrives, it should not send a pause command to the TV (see FIGS. 5, 25). Similarly, at the end of the call, it should not send a play command to the TV (see FIGS. 5, 26).

Figure 6:
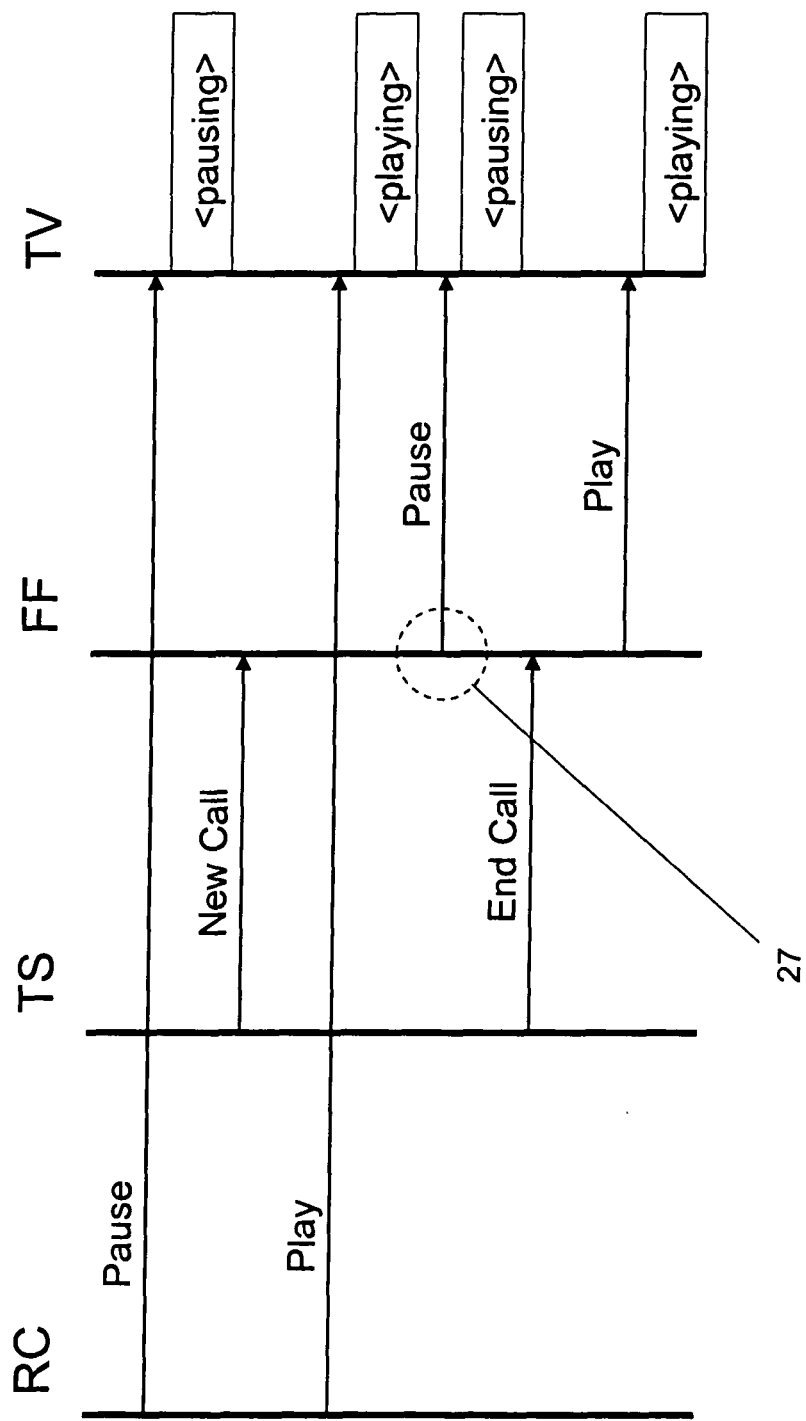
FIG. 6 illustrates the flow of a second service interaction in an exemplary embodiment of a combined service.

FIG. 6 illustrates the flow of a second interaction of FoneFreez with a Remote Control. In this situation the TV is set to <pausing> by the Remote Control, while another incoming call is received by FoneFreez. If somebody sends a play command to the TV using the remote control, the TV will start playing while the incoming telephone call is not yet finished. In order to avoid such a situation, FoneFreez may intervene by setting the state of the TV back to <pausing> (FIGS. 6, 27).

Figure 7:
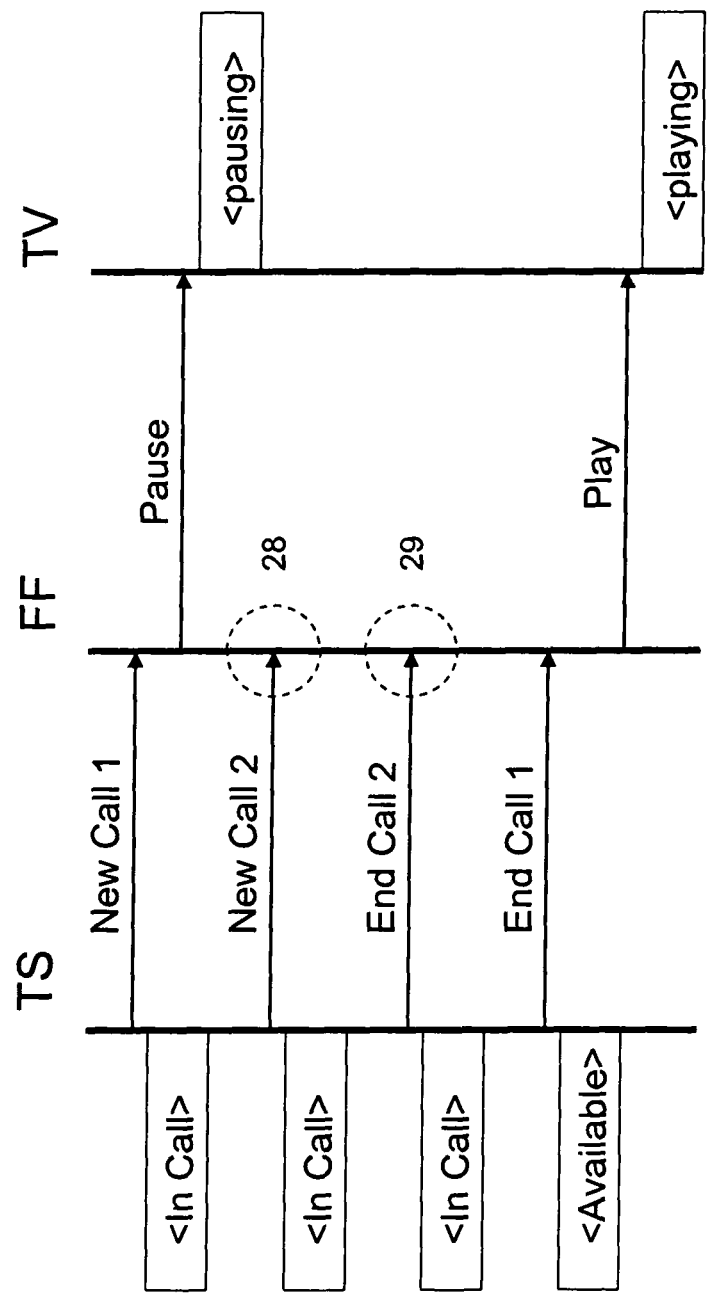
FIG. 7 illustrates the process flow of a third service interaction in an exemplary embodiment of a combined service.

FIG. 7 illustrates the flow of a third service interaction. In this case the telephone platform also provides a Call Waiting service (CW). This service allows a second incoming call to put on hold when the first call is still in progress. The user receiving the calls is able to switch between the first and second call. Without intervention of FoneFreez Select Call can introduce similar problems as discussed above in connection with the Remote Control.

The FoneFreez service would, for instance, send—upon the arrival of the second incoming call (New Call 2)—a pause command to the TV (which was due to a first call already in <pausing>) and send a play command to the TV after the termination of the second call (End Call 2). This will cause the TV to start playing while the first call is still in progress. FoneFreez may intervene in a similar way as described above, i.e. by not sending a pause command after the second incoming call (FIGS. 7, 28) and by not sending a play command after termination of the second call (FIGS. 7, 29).

Thus, in order to allow FoneFreez to manage service interactions, FoneFreez (i) should have state information regarding the TV and the telephone and (ii) should have information regarding the cause of changes in these states, (iii) should know when and how to take action.

In order to allow FoneFreez to process the state information and to take appropriate action in response to changes in the states of the state models of the telephone and TV state models in a simple and efficient way, the combined state model of FoneFreez should be determined.

The combined state-model comprises number of predetermined combined states {SC} defined by the combinations of the first states {S1}, e.g. the telephone states, and second states {S2}, e.g. the TV states. In order for the combined states to contain information regarding the cause of a state transition in the first and/or second states, at least one of these states is extended to a number of extended states. These extended states comprise at least a first extended state indicative that a transition to that state is caused by the combined service, e.g. FoneFreez, and a second extended state indicative that a transition to that state is caused by another source, e.g. the Remote Control or another service such as Call Select. Alternatively, the cause of a state transition may be processed by the combined state model in the form of state transition information, e.g. in the form of a state transition ID, which is send by the services to the combined services and comprises the cause of the state transition in a service.

The combined state model further comprises detection points {DC} for detecting a transition between two states of the combined state model. Some of these detection points are armed (active) detection points. The detection points are armed in order to detect the occurrence of a transition to which FoneFreez should respond to. If such detection point is triggered, FoneFreez will respond with a certain action, e.g. to prevent a transition to such unwanted combined state. In this way the combined service is able to manage (unwanted) service interactions.

Thus the combined states of FoneFreez are formed by the combinations of the states of the telephone service: <available> and <in_call>, and the TV service: <playing> and <pausing>. In order to introduce information regarding the cause of a transition to the state <pausing>, this state is extended to a first extended state <pausingFF>, indicating that the pausing state was caused by FoneFreez, and a second extended state <pausingOS>, indicating that the pause state was not caused by FoneFreez, but another source (OS). This leads to the following six combined states of the combined state model of FoneFreez:
<available,playing>, <in_call,playing>, <available,pausingFF>, <vailable,pausingOS>, <in_call,pausingFF>, <in_call,pausingOS>.

The combined states <available,pausingFF> and <in_call,pausingFF> refer to the states wherein FoneFreez set the TV on pause. The combined states <vailable,pausingOS> and <in_call,pausingOS> refer to the states wherein the TV was set on pause by another source, e.g. a Remote Control or Call Waiting.

In order to allow FoneFreez to react to state transitions in the combined state model active (or armed) detection points should be present. For instance, an active detection point should be present between the transition from <available, playing> to <in_call,playing> in order instruct FoneFreez that the TV should be put on pause, corresponding to the combined state <in_call,pausingPF>.

Figure 8:
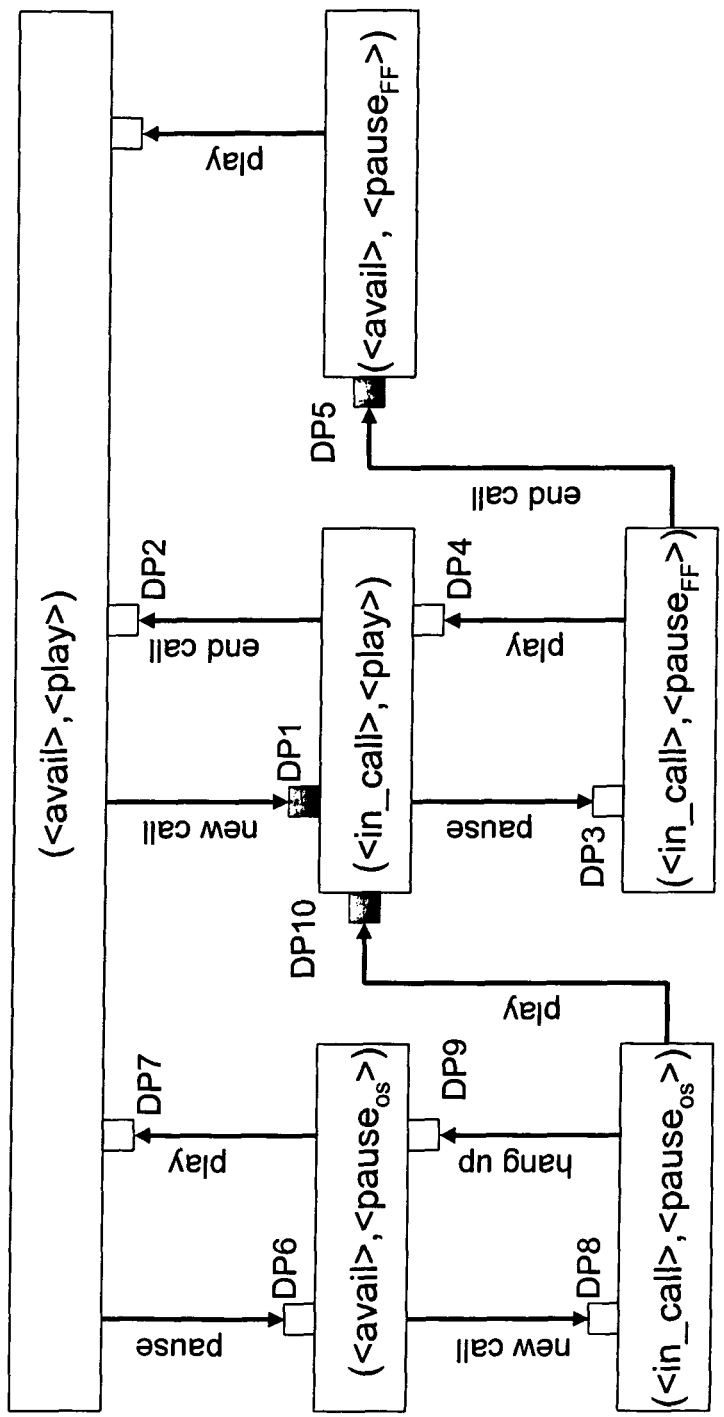
FIG. 8 depicts an exemplary example of a combined state model of an exemplary embodiment of a combined service.

FIG. 8 schematically shows a combined state model of FoneFreez describing the transitions to the various combined states of the service. The detection points will be briefly discussed:

- DP1 detects an incoming call. DP1 is active in order to instruct FoneFreez to send a pause command to the TV.
- DP2 detects the end of a telephone call while the TV was playing. No action is required from FoneFreez so DP2 is not active.
- DP3 detects that the TV is paused by FoneFreez via active DP1. DP3 is not active.
- DP4 detects that the TV is put on play while the a call is active. DP4 is not active.
- DP5 detects that the call is terminated. DP5 should be active in order to instruct FoneFreez to send a play command to the TV.
- DP6 detects that the TV is paused while no call is active DP6 is not active.
- DP7 detects that the TV is set on play while no call is active. DP7 is not active.
- DP8 detects an incoming call while the TV is on pause. DP8 is not active.
- DP9 detects the termination of the call while the TV is on pause. DP9 is not active.
- DP10 detects the TV is set from pause to play by another source than FoneFreez while a call is active. When desired DP10 can be made active in order to instruct FoneFreez to send a pause command to the TV.

It is not always required that the TV is on pause when a telephone call is active. The choice in which situation FoneFreez should take actions depends on how the service is configured. Part of the configuration is done at the design stage of the FoneFreez service. Another part could be configured according to the preference of the user.

For instance, a user could access FoneFreez via an interface, preferably a website interface, in order to select a predetermined configuration. Using the selected configuration FoneFreez is able to activate or deactivate the corresponding detection points in the state combined model of FoneFreez.

The functionality of the combined model may be extended. For instance, the <pausing> state could be extended further, for instance to the states <pausingFF>, <pausingRC> and <pausingCW> provide FoneFreez whether the FoneFreez itself, the Remote Control or a Call Waiting service changed the TV to <pausing>.

In general, the concept implementing a combined service by using a combined state model in a system and method according to the invention can be generally extended to systems offering a number of combined services combining services executed from many different service platforms.

FoneFreez should know which action should be taken upon activation of an armed detection point. This decision information can be stored in a decision database connected to the application server.

FoneFreez will have to update and evaluate the state information regarding the telephone service and TV service. It therefore has to perform the steps of:
- reception of state information from telephone and TV services (wherein the state information includes the current state of the services and—if a transition in the state of one of the services has occurred—state transition information regarding the cause of a transition in the first and/or second service);
- determination on the basis of that information whether a transition to a new combined state has occurred;
- check whether an armed detection point is triggered and—if so—determine using the decision information stored in the database which action should be executed by FoneFreez.

Such methods steps can be performed by the combined state manager, preferably in cooperation with state managers and event listeners as described above. The FoneFreez event listeners will "subscribe" to certain state transitions in the telephone and television service. Thereafter, the telephone and television service will "notify" FoneFreez of the occurrence of the state transitions to which FoneFreez had subscribed to by sending the requested state information to FoneFreez.

Figure 9:
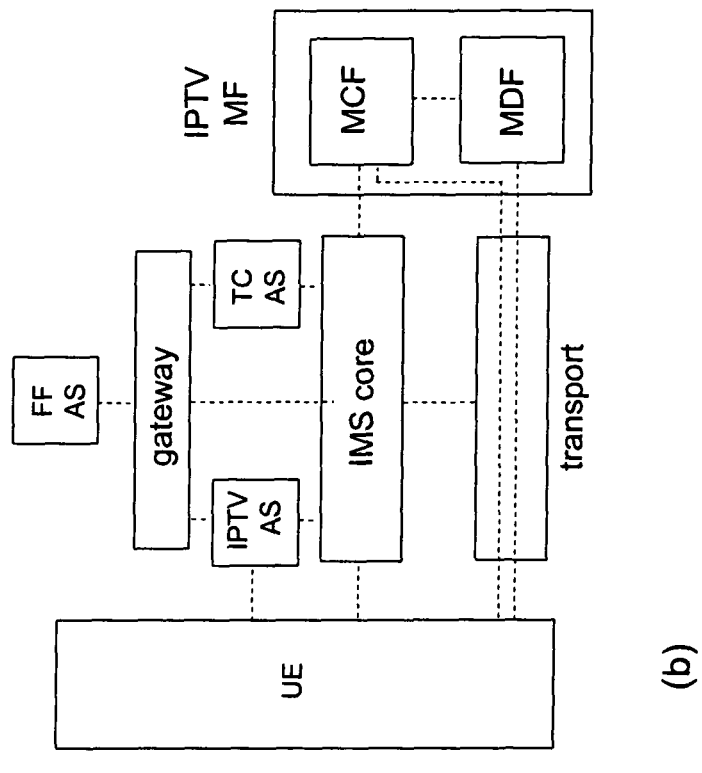
FIG. 9 depicts exemplary examples of a combined service implemented in a high level IMS-based IPTV architecture.
Figure 9:
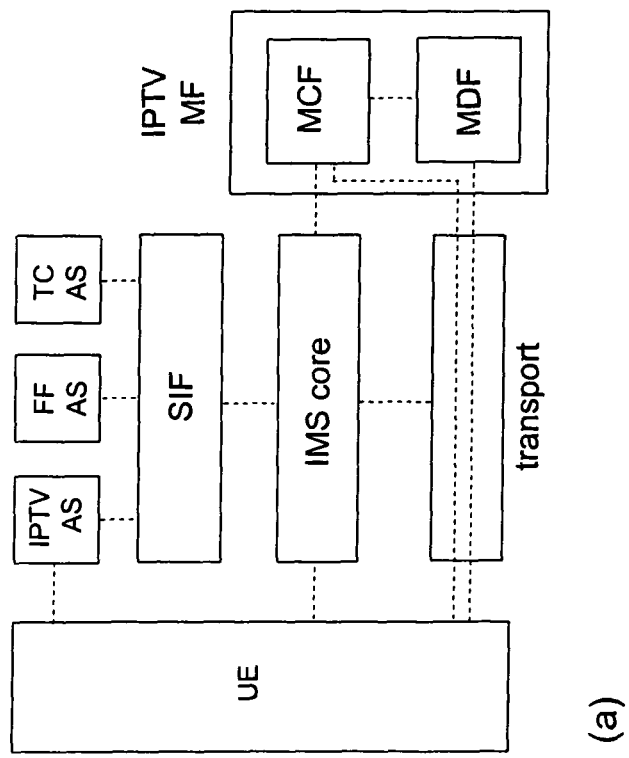

FIG. 9 depicts of a combined service according to the invention which is implemented in IMS-based IPTV architectures. FIG. 9(a) illustrates a simplified schematic of a first architecture as proposed in ETSI TS 182027 wherein an IMS core is connected to one or more User Equipment (UE) devices, a Transport Processing Function and a dedicated Service Interaction Function (SIF) (also referred to as the Service Capability Interaction Manager (SCIM)). The SIF connects one or more applications servers (AS) to the IMS core. These applications servers may include a combined service (CS) AS comprising a combined service such as the FoneFreeze service (or the POIC service) or the like, a telephony (TC) AS and an IPTV AS. The IMS core is further connected to an IPTV Media Function (MF) comprising e.g. an IPTV Media Control Function (MCF) and an IPTV Media Delivery Function (MDF) and an IPTV application server (AS) The IPTV AS (also known as IPTV Service Control Function, IPTV SCF), MCF and the MDF (also referred to as the IPTV service elements) provide the IPTV functionality to the IMS system.

FIG. 9(b) illustrates a simplified schematic of a second architecture as proposed in ETSI TS 182027. This architecture is similar to the one illustrated in FIG. 9(a) except for the fact that the combined service AS is connected indirectly (as an external application server) via a (transparent) gateway, e.g. a OSA/Parlay Service Capability Server (SCS), to the IMS core and the IPTV service elements. Also the AS are directly coupled to the IMS core, without the intervention of the SCIM.

Figure 10:
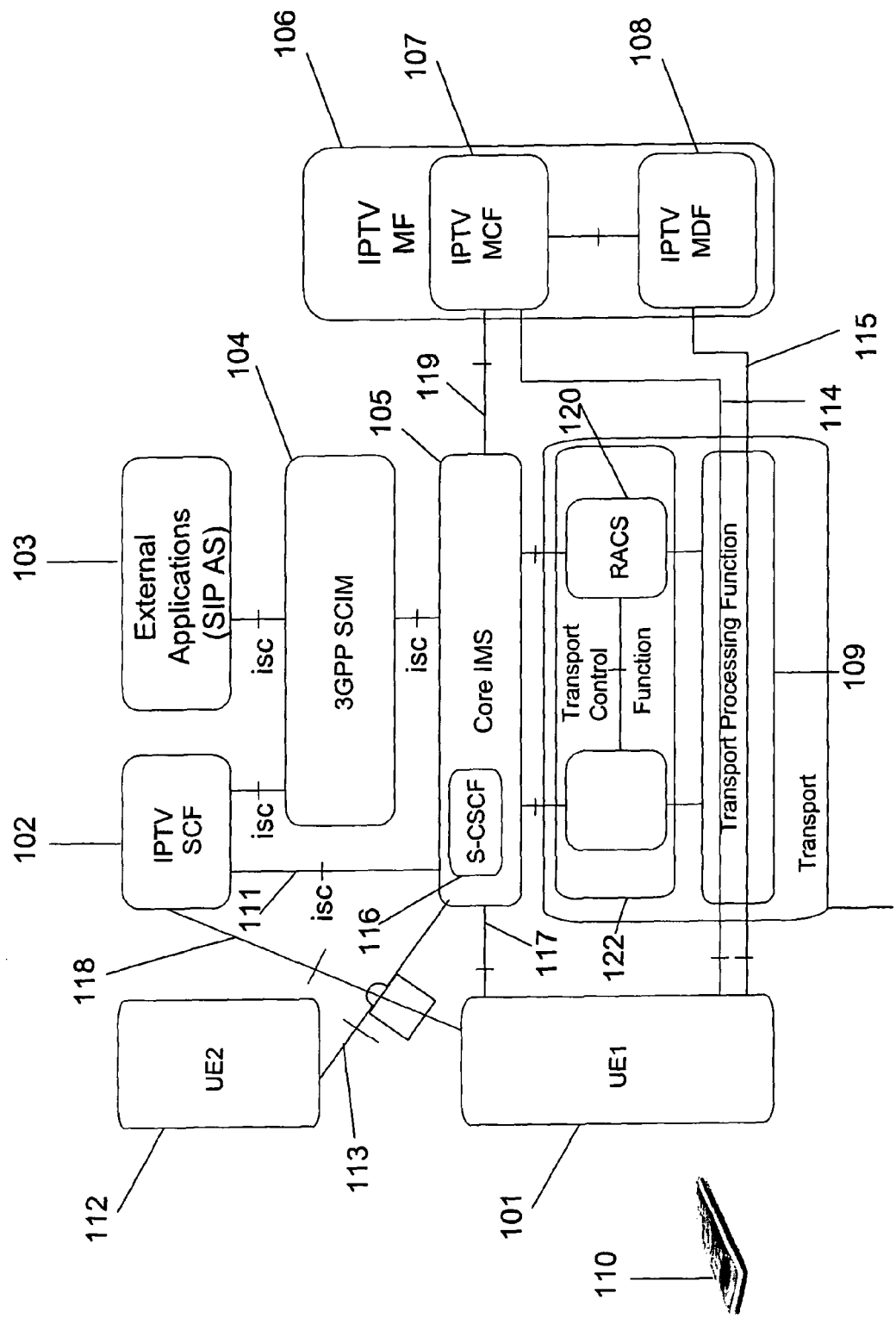
FIG. 10 depicts a detailed example of a combined service implemented in an IMS-based IPTV architecture.

FIG. 10 depicts a more detailed example of a combined service implemented in a NGN-based (Next Generation Network) IPTV architecture, e.g. in an IMS-based IPTV architecture. A first service may be a multimedia service provided by an NGN-based IPTV system, e.g. an IMS-based IPTV system. This multi-media service can be e.g. broadcast TV or a video-on-demand service. The multi-media service is a stateful service, meaning that the service comprises a multiple of possible states. The user can change channels, pause the stream and start it playing again, fast forward, rewind, skip ahead, etc, using e.g. his remote control 110 to send control commands to the UE1 101.

The first service delivery means for providing the such IPTV multimedia service may comprise:
- the media function (MF) 106 (more specifically the media control function (MCF) 107 and/or the media delivery function (MDF) 108), the Transport Processing Function (TPF) 109 and/or the UE1 101.

If in addition the Core IMS 105 and/or the IPTV SCF 102 are used for setting up a connection between UE1 101 and MF 106, these elements may also be part of the first service delivery means.

In a further embodiment the first service delivery means may only comprise the UE1 101. This may be in case of controlling (e.g. playback) a media stream, which is recorded in the UE1. The UE1 may contain multimedia files stored on a storage medium, e.g. a hard disk and may be configured to control such multimedia streams without the use of other network elements in the NGN. Such UE1 does not require sending of control messages to one or more network elements.

The multimedia stream, e.g. a streaming video, may flow from the MF 106 (or more specifically the MDF 108) to the UE1. The streaming media is transported via the TPF 109 and an interface 115 to the UE1. The TPF and the interface may consist of network equipment such as routers, switches and head-ends. Media delivery is controlled by the MCF 107, which receives commands from the UE1 through interface 114. Certain actions (e.g. trick plays, like pause) may also be executed directly inside the UE1.

To implement a combined service, such as FoneFreez, being able to control the multi-media service described above, the combined service delivery means may be located inside an IPTV Service Control Function (SCF) 102. As such, the combined service can send control messages through the IMS core 105 to the MF 106 (or more specifically the MCF 107) to control the multi-media service. These control messages can for instance comprise of action commands like 'pause', 'play', 'switch channel', etc.

Another embodiment for sending control messages to control the multi-media service, is to send control messages from the combined service (e.g. implemented in the IPTV SCF 102) to the UE1. The UE1 may execute the desired function itself, for example pausing a stream that is playing locally at the UE1 101 or pausing a stream coming from the MF 106 by recording it on UE1 101. Alternatively, the UE1 101 may execute the desired function by sending control messages to the MF 106 using interface 114.

In the example above, the combined service delivery means (CSDM) are implemented in the SCF. Alternative design options to implement the CSDM elsewhere are possible e.g.: in the UE1, in the MF 106, in the MCF 107, in a separate interaction management function 104 or in some external application server 103. In these cases the control messages could still be sent to e.g. either the MF 106 or the UE1 101. If the CSDM is implemented in either the UE1 101 or the MF 106, it could for example also control the multi-media service without sending control messages but by executing a control command internally.

Now turning back to FIG. 10, the second service in the FoneFreez example is a telephone service. In this case, the second service delivery means may be e.g. a telephone network, e.g. a PSTN or ISDN network, a GSM or UMTS network or a VoIP network (not shown in FIG. 10). In case of a circuit-switched network (PSTN, ISDN, GSM or UMTS), incoming call notifications may be sent using the INAP interface. In case of a VoIP network, the call notification may be sent using a SIP message. A second terminal may be e.g. the User Equipment 2 (UE2) 112 connected to the Core IMS 105 through interface 113. In that case the second terminal may be e.g. a mobile phone or any other device suited for making phone calls.

Using IMS, call setup is preferably executed by the S-CSCF 116. The S-CSCF 116 may send notifications of various types, e.g. about incoming calls, to an SCF (e.g. an IPTV SCF 102) using interface 111. These notifications, e.g. notifications on incoming calls or notifications on ending of calls, may contain the state information about the second service.

One exemplary way of notification of state (transition) information may be the MF 106 notifying the combined service in the SCF 102 about state transitions and their cause, either through the Core IMS 105 or through some direct signaling channel (not shown in FIG. 10).

Alternatively, the UE1 or even the TPF 109 could provide the state information, because these network elements are also aware of the state of the multi-media service. The UE 101 is aware of this, because the UE1 (in the given example) is where the service starts or is delivered. The TPS 109 may become aware of this by examining the flow of data between the UE 101 and the MF 106. This process of examining the flow of data in the transport network is also called 'snooping' (e.g. IGMP snooping or RTSP snooping). The UE1 101 or the TPS 109 may provide notifications on state transitions and their cause either through the core IMS 105 or through some other signaling channel.

Which element provides the notifications is dependent on where the state of the service is actually managed. A state manager may be implemented either in the MF 106 or in the UE1 101.

For a combined service to be aware of the states of the first and second service, it needs to receive state information about these services. In an NGN-based IPTV system, the combined service may receive state information about a multi-media service from:

The UE1 101. If the combined service is implemented in the IPTV SCF 102, the UE1 101 may send state information directly using e.g. interface 118 or through the IMS Core 105 using interface 117 and interface 111. If the combined service is implemented in the SCIM 104 or an external AS 103, the UE1 may send state information also through the Core IMS 105. If the combined service is implemented in the MF 106, it may send state information directly to the MF 106 using interface 114, or it may send state information through the core IMS 105.

The MF 106. If the combined service is implemented in the IPTV SCF 102, the MF 106 may send state information through the core IMS 105, using interfaces 119 and 111. If the combined service is implemented in the MF 106 itself, the MF 106 does not have to send state information, because the state information is already available at the MF 106. If the combined service is implemented in the UE1 101, the state information may be sent through the core IMS 105, using interfaces 119 and 117, or may be sent directly using interfaces 114 or 115.

The Transport 121, for example as implemented according to ETSI ES 282 001 V2.0.0. The Transport 121 comprises the Transport Processing Functions (TPF) 109, which carries the actually flow of data of media control and media delivery between UE1 101 and MF 106, and the Transport Control Function (TCF) 122, which control the TPF 109. In the exemplary implementation whereby the Transport 121 is supplying state information, the TPF 109 may detect the state of the service by 'snooping' the flow of data between the UE1 101 and the MF 106. The TPF 109 may inform the TCF 122 (or more specifically a Resource and Admission Control Subsystem (RACS) 120) about the detected state. The TCF 122 may then deliver state information e.g. through the IMS Core 105 to the combined service implemented in e.g. the SCF 102, the UE1 101, the SCIM 104, the AS 103 or the MF 106.

Figure 11:
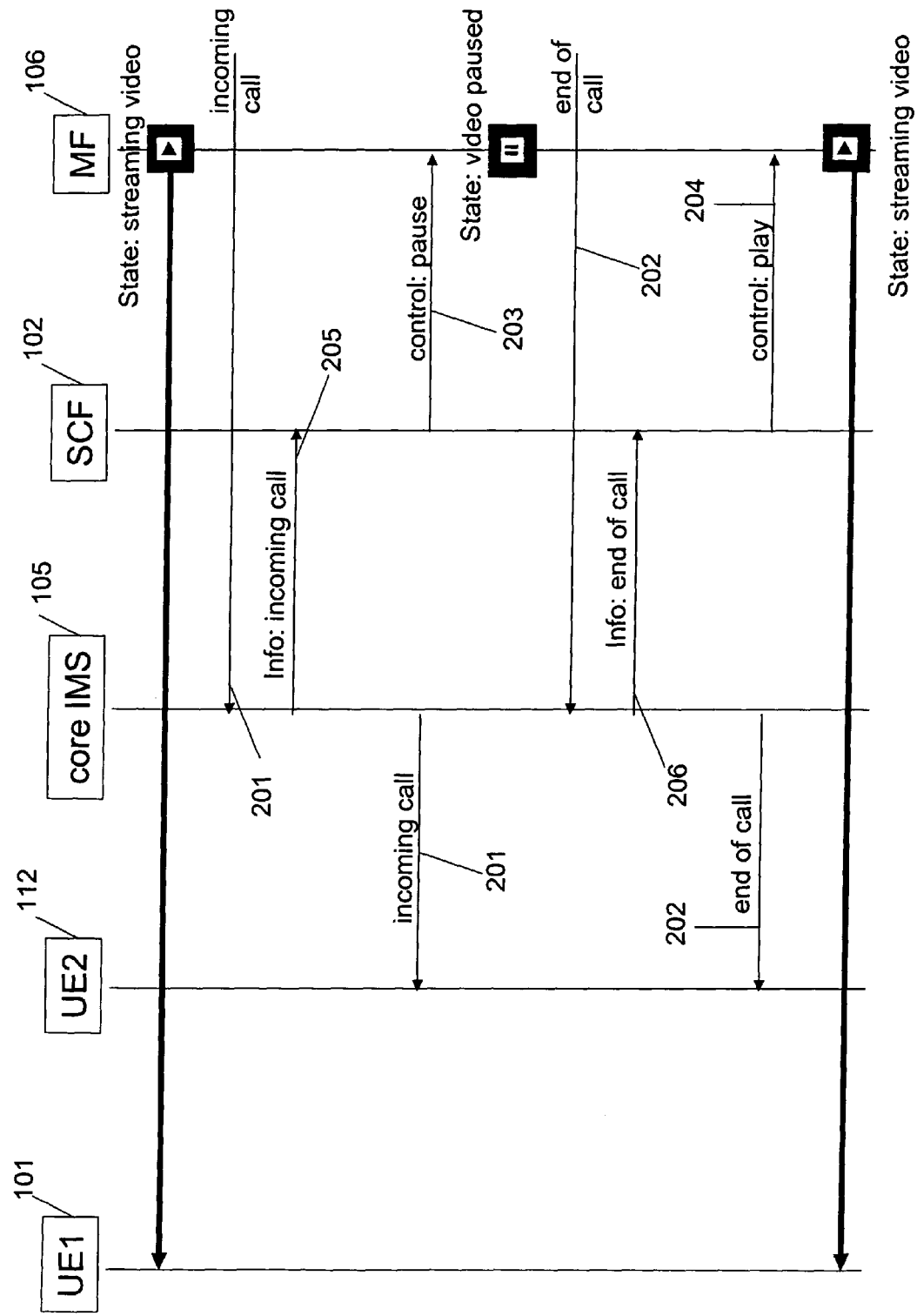
FIG. 11 shows a flow diagram of an exemplary message flow of the service interaction, applying the invention within an IMS environment.

FIG. 11 shows a flow diagram of an exemplary message flow within an IMS environment as depicted in FIG. 10.

Using FoneFreez as an example of a combined service, the second service is a telephone service. In an IMS environment, applications are notified of events in a communication session (such as the start of a telephone call 201 or the end of a telephone call 202) through the ISC interface 111. Following a (telephone) call event 201 or 202, the FoneFreez service running in the SCF 102 is notified of incoming calls through respectively 'incoming call' notification 205 (in IMS called a SIP INVITE message) or 'end of call' notification 206 (in IMS called a SIP BYE message) sent from the Core IMS 105. The FoneFreez service running in the SCF then induces a state transition in the media delivery of the multi-media service by sending respectively a control message 203 (to pause the current multimedia service following notification 205) or a control message 204 (to play the current multimedia service following notification 206) to the MF 106.

In order to manage the interactions between the services (e.g. as described above in relation to FIG. 5-11), the services and the combined services in the IMS system need to have access to status information of each service in an efficient way.

The service status information may include state information, state transition information, state history information, state transition history information and/or media action data/commands (i.e. play, stop, pause, etc.) of one or more services connected to the IMS network.

State history information may comprise information about the last N previous states of the service delivery means, wherein N is an integer greater than zero. Furthermore, it may comprise information about the cause of the last N previous state transitions. The media action data may comprise any action performed on the media service delivered to the UE, e.g. pause, play, fast forward, change channel, skip to next chapter. This media action data may contain information about which element in the IPTV architecture (e.g. an IPTV service or a UE device) performed the media action.

In one embodiment, the service status information is retrieved and managed by a functional unit in one or more IPTV service elements in the IMS system. This IPTV service element may comprise of one or more state managers as described above in relation to FIG. 2. The state manager may collect the status information from all services available to the IMS system thereby making the service status information centrally available and/or accessible to the services in the IMS system. The IPTV service hosting the one or more state managers may be connected to a service status database for storing the service status information. A service may receive the service status information from these state managers in various ways.

In one embodiment a SIP subscribe/notify method (as described in RFC 3265) may be used, wherein a service subscribes to specific service status information and is notified about this information upon availability. In this embodiment, a SIP subscribe message leads to arming a detection point in a state manager comprised by a service element, and a SIP notify message is returned when the armed detection point is actually triggered by a event that was subscribed to. In another embodiment a retrieval mechanism may be implemented where a service requests the information and an IPTV service element supplies the information in response to the request. In yet another embodiment an IPTV service element supplies the service status information to all associated services (e.g. periodically or upon availability) without the requirement of a subscription or separate requests.

In response to the reception of the service status information the service may send one or more control messages to an IPTV service element, thereby controlling the media session. Such control message may comprise media control actions e.g. pause, play, fast forward, rewind, skip ahead, skip backwards and/or change channel.

In a further embodiment the service may be hosted by the IPTV service element comprising the functional unit which manages the service status information. In that case the service may direct access to the service status information allowing direct control of the media session.

Figure 12:
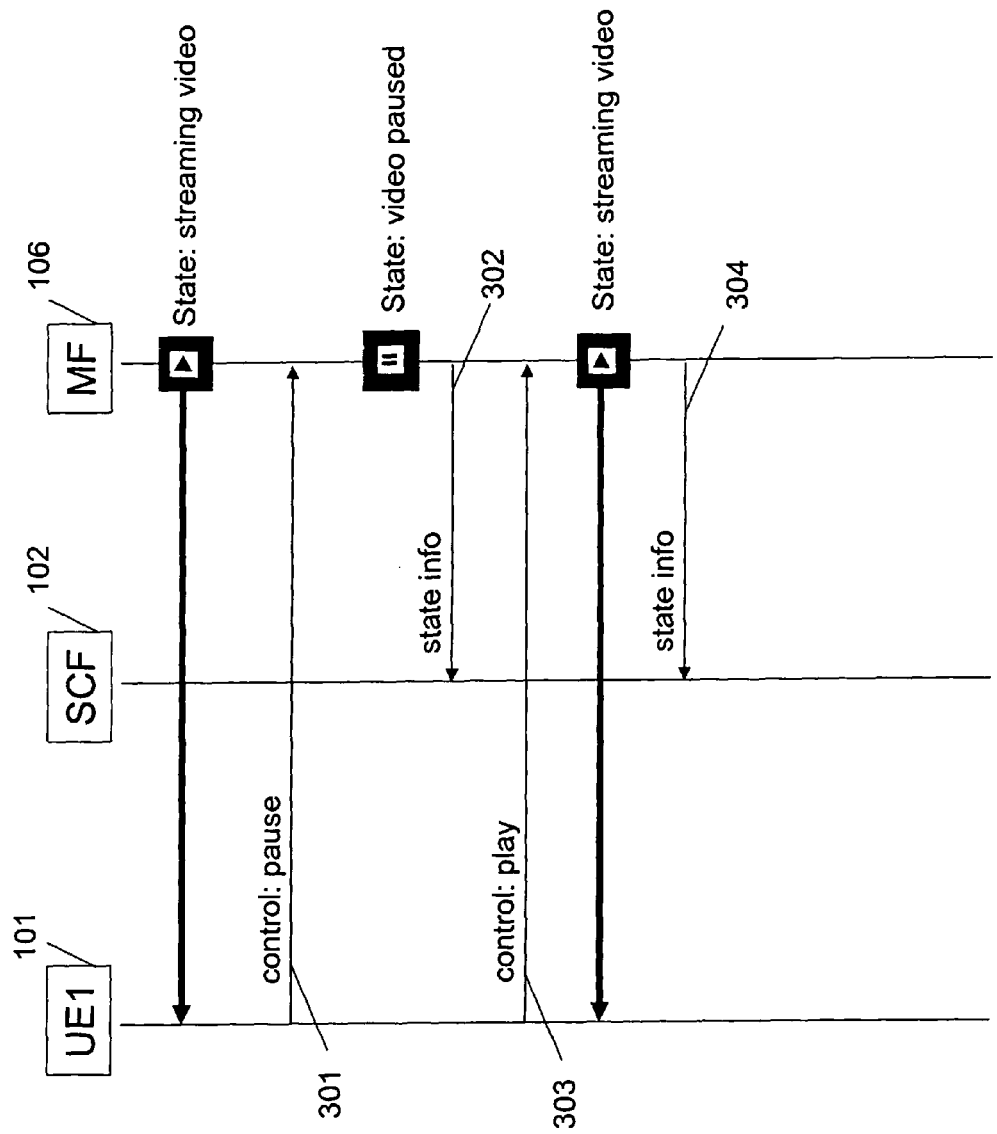
FIG. 12 illustrates an exemplary flow of state information messages within an IMS environment.

An illustrative example of the message flow of service status information is depicted in FIG. 12. This example relates to the previously described embodiment of the combined service FoneFreez, within an IMS-IPTV architecture, such as shown in FIGS. 10 and 11.

In the detailed FoneFreez example, the combined service delivery means implemented in the SCF not only receives information on the state of the First Service (i.e. 'paused' or 'playing'), but also on state transitions and their cause. More concrete: if the user uses his Remote Control to pause or play the multi-media service (i.e. the UE1 sends a control message 301 or 303 to the MF), the MF not only notifies the SCF (i.e. sending a notification message 302 or 304) of the particular state transition, but also that the Remote Control is the cause of this state transition. This notification of the cause of the state transition may also be regarded as extended state information. Therefore, once an incoming call arrives, the FoneFreez service is not only aware of the current state of the multi-media service, but also of the cause of that state. Alternatively the service state information of the multimedia service may only be requested by the combined service, upon receiving a notification of an incoming or ending call event. This way, the FoneFreez service may decide autonomously how to proceed.

For the combined service, it is important that it is able to identify and associate the different services linked together. In the FoneFreez example, this could be done using an identifier of the user equipment in the IMS-based IPTV system, e.g. an IMS Public Identify, and using an identifier of the user in the telephone system, usually a telephone number. The combined service will need to keep track of the correlation of these identifiers, so it can link the proper end-terminals UE1 and UE2 together.

In the exemplary, IMS-based implementation, preferably the following two types of notifications are used. In the clarification below the terms notifier and notified are used as general terms for some module comprising of programming code on hardware that within the IMS architecture has a specific function or functions and that is capable of either sending notifications (notifier) or receives notifications (notified).

A first notification type is shoot-and-forget. The notifier sends a notification to the notified, but the notifier is able to continue to run as normal. Running processes are not stopped, and new state transitions and the like may still occur. This is e.g. shown in FIG. 12 where notification 302 is sent to the SCF, while the MF will continue to run without further involvement of the SCF.

A second type of notification is control handover. When a notifier hands over control to a notified, the notified not only receives a notification but is also given control. This means that the notifier will wait before proceeding with what it was doing. When the SCF receives a notification through the Core IMS, it can receive control. The Core IMS will can send the SIP INVITE as a notification of the incoming call, but can wait for a response of the SCF before notifying the UE2 of the incoming call through a notification to the UE2.

Notifications may be sent either before or after a state transition:

If sent before a state transition, this is usually a control handover type of notification. This gives the notified the option of changing the behavior of the notifier, before the state actually is changed.

If sent after a state transition, this is usually a shoot-and-forget type of notification. An event i.e. a state transition) has occurred, and the notifier gives notice about this.

The invention is not limited to the embodiments described above, which may be varied within the scope of the accompanying claims. For instance, the claimed invention may be used for managing other combined services such as displaying caller ID information on the television screen as described in the prior-art. A further example of a combined service may be a "television click-to-dial" service, which upon activation ("clicking") of a telephone number on the TV screen (e.g. a number in an advertisement) automatically forwards the user to that number. Further, the claimed invention may be used to manage combined services comprising more than two service providing means. The more than two service providing means may provide more than two services, controlled by one or more combined services. More than two service state managers may be involved in the combined services, as well as more than two service logics.

To illustrate the broad potential use of the invention, some further examples are provided below:

Further Example 1

In this example, the first service is a sunblind system. A user can manually raise or lower the blinds, to let the daylight in or keep it out. So, this first service has the states 'raised' and 'lowered'. Now a second service is a weather measurement service, measuring for instance the outside temperature and measuring the amount of sunlight currently detected. A combined service here can combine these two services to automatically raise and lower the blinds, depending on the temperatures and amount of sunlight measured, but taking into account user specific actions as well. Normally, on a sunny day when the temperature rises above a certain point, the combined service will induce a state transition in the first service, by lowering the blinds. But when the user has already lowered the blinds, this is not necessary, although lowering them again will not have any effect. But suppose the day becomes more cloudy, and the temperature drops below a certain threshold. Normally, the combined service would again induce a state transition by raising the blinds. But, because the user manually caused the 'lowered' state in the first service, for instance because he needs a darkened room for watching a movie on his home theater system, the combined service can be programmed to automatically refrain from sending a control signal to lift the blinds. So the detection point for the transition of the combined state from manually_lowered+sunny weather to manually lowered+cloudy weather is not armed and no action will be taken by the combined service, whereas the detection point for the transition of the combined state from automatically_lowered+sunny weather to automatically lowered+cloudy weather is armed and action will be taken Further example 2

Another example is in driving a car. A car can have multiple states, e.g. 'driving', 'standing still', 'accelerating', 'decelerating' and 'breaking'. This 'first service' is usually directly under control of the user, in this case the driver. But sometimes this first service is also under control of a car service, e.g. using an automated speed limiter to prevent speeding. Cars nowadays also have advanced electronics and software, car management systems, etc. As a second service, this car management system monitors the condition of the car, which can have states like 'in good condition', 'out-of-oil', 'overheated', etc. One combined service could be to limit a car's speed based on the current condition of the car, e.g. to prevent overheating. Here also service interaction occurs: a driver is first being limited by the speed limiter, but can override this by indicating that he indeed wants to go faster (pressing the pedal to the metal). So, if the speed limiter is the cause of the transition from 'accelerating' to 'driving stationary', a user can override this. But, if the speed is limited by the car management system to prevent overheating, a user cannot override this.

These examples clearly show that using combined services are possible in other areas besides telecommunication. Building combined states leads to certain service behavior. Using service status information, further sophisticated service interaction management can be performed.

The invention claimed is:

1. A system for managing service interactions between a first service and a second service, through a combined service, comprising:

a first service delivery means for providing a first service;

a second service delivery means for providing a second service different from the first; and a combined service delivery means configured to:

provide a combined service by associating the first service with the second service using combined states, wherein a given combined state comprises a first information indicative of at least one state of the first service, and a second information indicative of at least one state of the second service, and wherein at least one of said states is extended to at least one extended state, said one extended state further indicating a cause of a state transition to the specific state, and further use an armed detection point for detecting a transition between specific combined states, at least one of said combined states including an extended state, and wherein the combined service delivery means is further configured to transmit a control signal to at least one of the first or second service delivery means for inducing a predetermined state transition in at least one of the first or second service in response to triggering of an armed detection point, the armed detection point depending on a state transition of one of the services of the specific combined states; and wherein the first service delivery means is configured to execute a first service logic and the second service delivery means is configured to execute a second service logic, the first and second service logic being implemented using a first and second state model respectively, each comprising the states of the service, state transitions, and detection points for detecting state transitions.

2. The system according to claim 1, wherein the combined service delivery means is further configured to receive state information about the first and second service and to determine the combined state of the combined first and second services.

3. The system according to claim 1, wherein the combined service delivery means further comprises a combined service logic which, upon activation of a respective one of one or more armed detection points, retrieves from a decision database service interaction information associated with the respective armed detection point and transmits on the basis of the service interaction information a control signal to the first or second service delivery means.

4. The system according to claim 1, wherein the extended states comprise at least a first extended state indicative that a transition to the state is caused by the combined service.

5. The system according to claim 1, wherein the extended states comprise a second extended state indicative that a transition to the state is caused by the first or second service or some further service.

6. The system according to claim 1, wherein the combined service delivery means further comprises a first and second state manager for receiving state information from the first and second service respectively.

7. The system according to claim 1, wherein the combined service manager further comprises an event listener adapted to subscribe to notifications from the first and/or second service, the notifications including state information regarding the respective first and second services.

8. The system according to claim 2, wherein the state information comprises the state of a service and state transition information identifying the cause of the transition to the state.

9. The system according to claim 1, wherein the first service delivery means is a telephone service executed on a telephone platform comprising at least a state <available> indicative that the telephone is available and a state <in_call> indicative that the telephone is in call and wherein the second service delivery means is a television service executed on television platform comprising at least a state <playing> indicative that the television is playing and a state <pausing> indicative that the TV is on pause.

10. The system according to claim 9, wherein the combined service states comprise combinations between the states <available> and <in_call> of the telephone service and the states <playing>, <pausingCS> <pausingOS> of the television service, wherein <pausingCS> represents a first extended state of the <pausing> state indicative that the combined service (CS) caused a transition to that state and the <pausingOS> represents a second extended state of the state <pausing> indicating that another service (OS) than the combined service caused a transition to that state.

11. The system according to claim 1, wherein the combined service is configured to allow a client to access the combined service via an interface, in order to select a predetermined configuration of the combined service, wherein the combined service uses the selected configuration to arm one or more of the armed detection points in the combined model.

12. The system according to claim 11, wherein the interface is a website interface.

13. The system according to claim 1, wherein at least one of the first and second service delivery means is a telecommunications platform selected from the group consisting of a platform supporting IP-based telecommunications services, a digital television platform, a platform for executing business process management services, and a platform for home network system.

14. The system according to claim 1, wherein the combined service delivery means is implemented as an application server connected via a network to the first and second service delivery means.

15. The system according to claim 1, wherein the combined service delivery means is implemented in an end-terminal set-top box.

16. The system according to claim 15, wherein the first and second service delivery means are implemented with the combined service delivery means in the end-terminal set-top box.

17. The system according to claim 1, wherein the combined service delivery means further comprises a combined service logic which, upon activation of a respective one of one or more armed detection points, retrieves from a decision database service interaction information associated with the respective armed detection point and transmits on the basis of the service interaction information a control signal to the first and second service delivery means.

18. A method for managing service interactions in a system for providing a combined service comprising:
   a combined service delivery device associating a first service provided by a first service delivery device and a second service provided by a second service delivery device different from the first using combined states, wherein a given combined state comprises a first information indicative of at least one state of the first service, and a second information indicative of at least one state of the second service, and wherein at least one of said states is extended to at least one extended state, said one extended state further indicating a cause of a state transition to the specific state;
   the combined service delivery device using an armed detection point for detecting a transition between specific combined states, at least one of said combined states including an extended state,
   wherein the combined service delivery device is further configured to transmit a control signal to at least one of the first or second service delivery device for inducing a predetermined state transition in at least one of the first or second service in response to triggering of an armed detection point, the armed detection point depending on a state transition of one or the services of the specific combined states; and
   wherein the first service delivery device is configured to execute a first service logic and the second service delivery device is configured to execute a second service logic, the first and second service logic being implemented using a first and second state model respectively, each comprising the states of the service, state transitions, and detection points for detecting state transitions.

19. An article of manufacture including a non-transitory computer readable medium having instructions stored thereon that, in response to execution by a computing device, cause the computing device to perform operations comprising:
   associating a first service provided by a first service delivery device and a second service provided by a second service delivery device different from the first using combined states, wherein a given combined state comprises a first information indicative of at least one state of the first service, and a second information indicative of at least one state of the second service, and wherein at least one of said states is extended to at least one extended state, said one extended state further indicating a cause of a state transition to the specific state;
   using an armed detection point for detecting a transition between specific combined states, at least one of said combined states including an extended state;
   transmitting a control signal to at least one of the first or second service delivery device for inducing a predetermined state transition in at least one of the first or second service in response to triggering of an armed detection point, the armed detection point depending on a state transition of one of the services of the specific combined states; and
   wherein the first service delivery device is configured to execute a first service logic and the second service delivery device is configured to execute a second service logic, the first and second service logic being implemented using a first and second state model respectively, each comprising the states of the service, state transitions, and detection points for detecting state transitions.

20. An end terminal comprising:

a first service delivery means for providing a first service;

a second service delivery means for providing a second service different from the first; and a combined service delivery means configured to:

provide a combined service by associating the first service with the second service using combined states, wherein a given combined state comprises a first information indicative of at least one state of the first service, and a second information indicative of at least one state of the second service, and wherein at least one of said states is extended to at least one extended state, said one extended state further indicating a cause of a state transition to the specific state, and further using an armed detection point for detecting a transition between specific combined states, at least one of said combined states including an extended state, and wherein the combined service delivery means is further configured to transmit a control signal to at least one of the first or second service delivery means for inducing a predetermined state transition in at least one of the first or second service in response to triggering of an armed detection point, the armed detection point depending on a state transition of one of the services of the specific combined states; and wherein the first service delivery means is configured to execute a first service logic and the second service delivery means is configured to execute a second service logic, the first and second service logic being implemented using a first and second state model respectively, each comprising the states of the service, state transitions, and detection points for detecting state transitions.

* * * * *